(12) United States Patent
Hunter et al.

(10) Patent No.: US 7,180,669 B2
(45) Date of Patent: Feb. 20, 2007

(54) METHOD AND SYSTEM FOR GENERATING SUBSTANTIALLY UNIFORM SPECKLE PATTERNS

(75) Inventors: Susan Hunter, Fort Collins, CO (US); Annette C. Grot, Cupertino, CA (US)

(73) Assignee: Avago Technologies ECBU IP (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 11/016,415

(22) Filed: Dec. 17, 2004

(65) Prior Publication Data

US 2006/0132921 A1    Jun. 22, 2006

(51) Int. Cl.
*G02B 5/18*  (2006.01)

(52) U.S. Cl. .................. 359/569; 359/565; 359/19

(58) Field of Classification Search ............. 359/565, 359/569, 15, 19, 615, 599
See application file for complete search history.

(56) References Cited

U.S. PATENT DOCUMENTS

| | | | | |
|---|---|---|---|---|
| 5,850,300 A | * | 12/1998 | Kathman et al. | ............ 359/9 |
| 6,002,520 A | | 12/1999 | Hoch et al. | |
| 6,618,185 B2 | * | 9/2003 | Sandstrom | ............ 359/292 |

\* cited by examiner

*Primary Examiner*—Fayez G. Assaf

(57) ABSTRACT

A diffractive optical element is positioned in an optical path between a coherent light source and a surface. The diffractive optical element is designed to disperse the light across one or more spots on the surface in a manner designed to create speckle patterns having substantially uniform intensities.

16 Claims, 4 Drawing Sheets

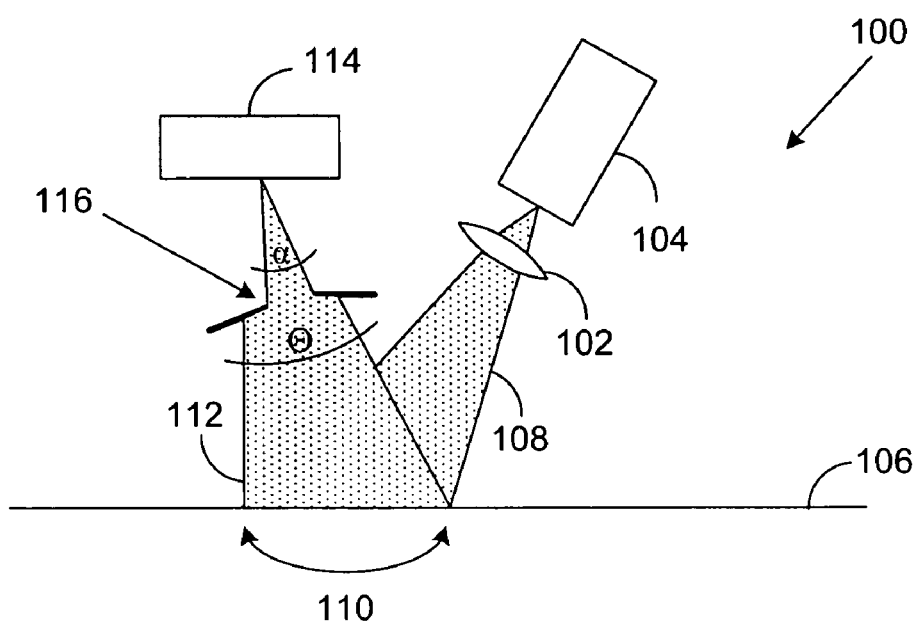
FIG. 1 – Prior Art
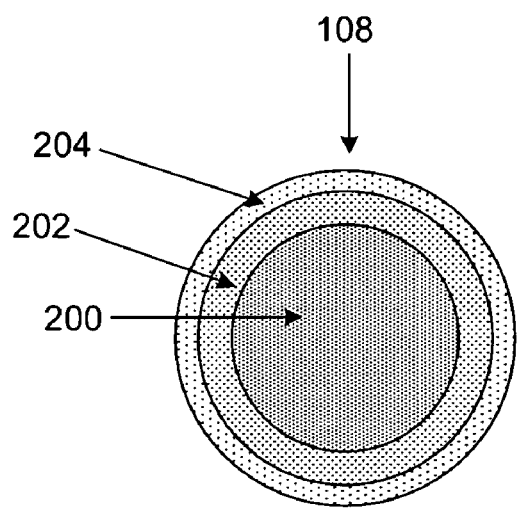
FIG. 2 – Prior Art

METHOD AND SYSTEM FOR GENERATING SUBSTANTIALLY UNIFORM SPECKLE PATTERNS

BACKGROUND

The term "speckle" refers to the random distribution of light reflected off a surface. Speckle typically has a high contrast field of spots (or "speckles") that are randomly distributed in position but relatively uniform in their size and brightness. The individual speckles in a speckle observation plane have an average size that is directly proportional to the wavelength and inversely proportional to the viewing angle subtended at the observation plane by the illuminated area of the surface. Thus, when the position of the detector plane is fixed with respect to the observation plane, the size of the speckles can be controlled by the size of the illumination area.

Increasing or decreasing the distance between the diverging (or converging) light source and the surface is one technique that alters the size of the illumination area. Another technique is to place a lens with an appropriate focal length between the light source and the surface. In FIG. 1, which is a diagrammatic illustration of an optical illumination system according to the prior art, lens 102 is placed between coherent light source 104 and surface 106. When the beam of light 108 is emitted towards surface 106, lens 102 directs the beam towards illumination area 110. Light 112 reflecting off surface 106 creates speckle.

Including lens 102 in system 100 increases the cost and complexity of system 100. Lens 102 must be positioned and centered at the proper distance from light source 104 to effectively direct the light towards illumination area 110. And lens 102 cannot efficiently and significantly transform the intensity profile of illumination area 110 despite being able to change the size of illumination area 110.

FIG. 2 depicts an intensity profile for illumination area 110 in FIG. 1. The intensity profile of FIG. 2 is typically generated when light 108 underfills lens 102. The intensity profile includes regions 200, 202, 204 which have varying intensities. Region 200 illustrates an area where the intensity of the beam is greatest. Region 202 depicts an area with less intensity compared to region 200 while region 204 illustrates an area having less intensity than region 202. This non-uniform intensity profile is known as a Gaussian profile and is typically undesirable for creating and detecting speckle patterns for motion measurements and speckle navigation.

With a Gaussian profile, an optical element such as aperture 116 (see FIG. 1) must be positioned such that a compromise is reached between the optical efficiency of the system and the uniform illumination of the viewable area. A small aperture ($\alpha<<\Theta$) causes illumination area 110 to appear more uniform when viewed from detector 114 (when 114 is aligned to be centered on the brightest portion of the intensity profile, region 200). But when the aperture 116 is small, a considerable amount of light does not strike detector 114. A larger aperture 116 transmits more light to detector 114 but the portion of illumination area 110 viewed by detector 114 has poor uniformity.

SUMMARY

In accordance with the invention, a method and system for generating substantially uniform speckle patterns are provided. A diffractive optical element is positioned in an optical path between a coherent light source and a surface. The diffractive optical element is designed to disperse the light across one or more spots on the surface in a manner designed to create speckle patterns having substantially uniform sizes and intensities.

BRIEF DESCRIPTION OF THE DRAWINGS

The invention will best be understood by reference to the following detailed description of embodiments in accordance with the invention when read in conjunction with the accompanying drawings, wherein:

FIG. 1 is a diagrammatic illustration of an optical illumination system according to the prior art;

FIG. 2 depicts an intensity profile for illumination area 110 of FIG. 1;

DETAILED DESCRIPTION

The following description is presented to enable one skilled in the art to make and use embodiments in accordance with the invention. Various modifications to the disclosed embodiments will be readily apparent to those skilled in the art, and the generic principles herein may be applied to other embodiments. Thus, the invention is not intended to be limited to the embodiments shown, but is to be accorded the widest scope consistent with the appended claims and with the principles and features described herein.

Figure 3:
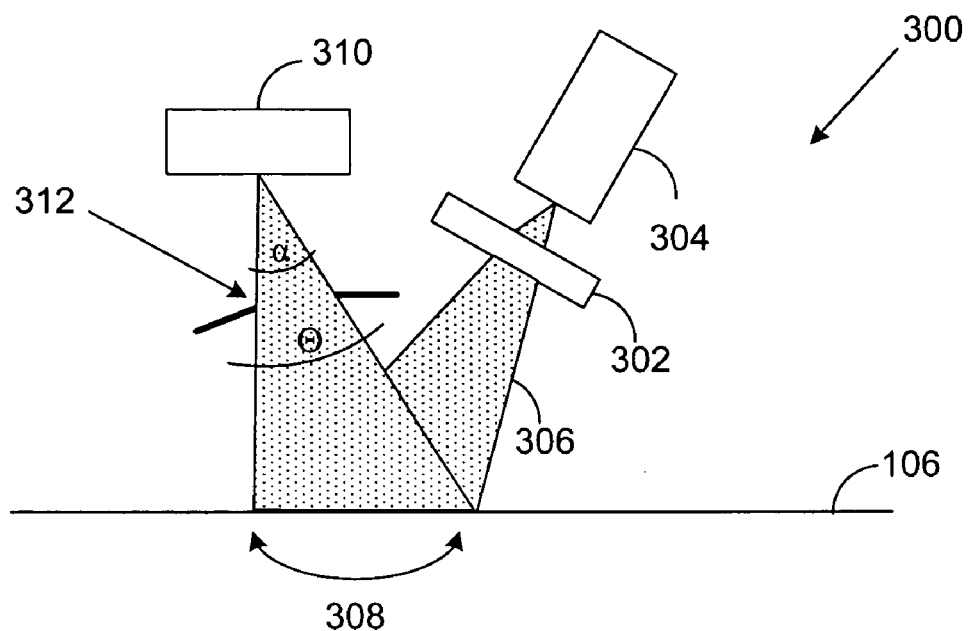
FIG. 3 is a diagrammatic illustration of an optical illumination system in an embodiment in accordance with the invention.

With reference to the figures and in particular with reference to FIG. 3, there is shown a diagrammatic illustration of an optical illumination system in an embodiment in accordance with the invention. System 300 includes diffractive optical element (DOE) 302 positioned in an optical path between light source 304 and surface 106. A DOE is an element that transforms or adjusts the phase front of a beam of light with diffraction rather than refraction or reflection. A DOE controls the direction and distribution of the beam of light. Examples of a DOE include, but are not limited to, a diffractive array generator, a Fresnel lens, and a diffractive grating.

Light source 304 is any spatially coherent light source, such as, for example, a laser. Light source 304 and DOE 302 are stand-alone optical elements in one embodiment in accordance with the invention. In another embodiment in accordance with the invention, DOE 302 is integrated with light source 104. For example, DOE 302 may be formed on a surface of light source 104 or integrated into the packaging of light source 104.

In general, DOE 302 is designed to disperse light 306 in a manner that generates uniform illumination area 308 and creates speckle patterns having substantially uniform sizes and intensities. The light in illumination area 308 is a single beam of light in one embodiment in accordance with the invention. In another embodiment in accordance with the invention, the light in illumination area 308 is multiple spots or beamlets of light.

Figure 4:
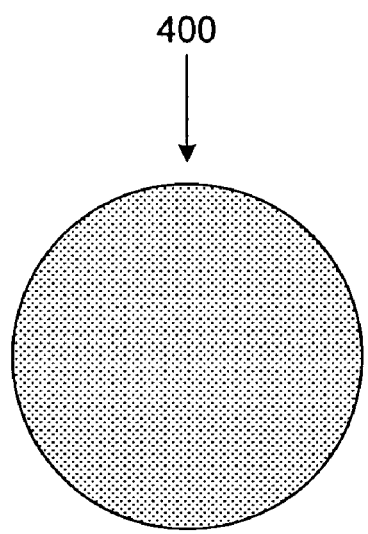
FIG. 4 depicts illumination area 308 generated by the system of FIG. 3.

FIG. 4 depicts illumination area 308 generated by the system of FIG. 3. Illumination area 308 is one of constant intensity within a certain radius and little or no intensity outside of the radius, The intensity profile 400 shown in FIG. 4 is known as a tophat intensity profile. A tophat intensity profile allows the optical path between surface 106 and detector 310 to be designed with the highest optical efficiency. Thus, in the embodiment of FIG. 3, optical element 312 is placed such that $\alpha=\theta$. Optical element 312 is configured as an aperture in FIG. 3. In other embodiments in accordance with the invention, optical element 312 may be implemented with other types of optical elements, including, but not limited to, a lens or a lens and aperture combined.

DOE 302 is implemented as a diffractive array generator in one embodiment in accordance with the invention. Diffractive array generators are typically designed using computer-aided design procedures. FIG. 5A is a diagrammatic illustration of a number of beamlets generated by a diffractive array generator in an embodiment in accordance with the invention. DOE 302 generates beamlets 500–530 in illumination area 532 and offsets each beamlet from adjacent beamlets such that when the intensity profiles of the beamlets are combined an overall substantially uniform intensity profile is created. The overall substantially uniform intensity profile results in speckle patterns having substantially uniform intensities.

Figure 5B:
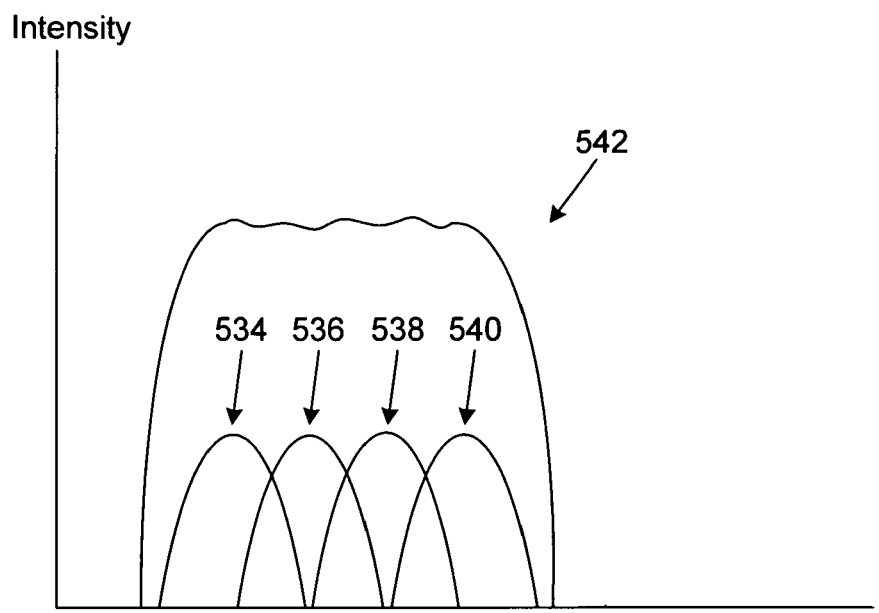
FIG. 5B shows intensity profiles 534, 536, 538, 540 disposed along line 5C—5C in FIG. 5A.
Figure 5A:
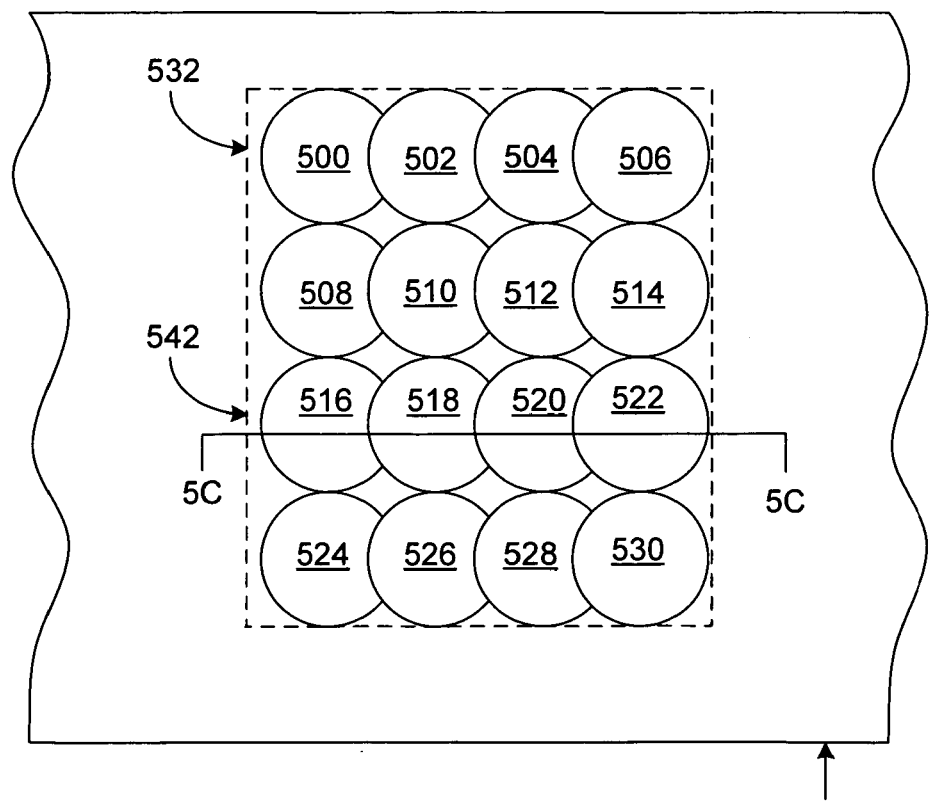
FIG. 5A is a diagrammatic illustration of a number of beamlets generated by a diffractive array generator in an embodiment in accordance with the invention.

FIG. 5B shows intensity profiles 534, 536, 538, 540 disposed along line 5C—5C in FIG. 5A. Overall intensity profile 542 is formed by combining intensity profiles 534, 536, 538, 540. In this manner DOE 302 produces a substantially uniform intensity profile for the combined intensity profiles of beamlets 500–530. In other embodiments in accordance with the invention, illumination area 532 is formed with a single beam of light.

U.S. Pat. No. 6,002,520, incorporated herein by reference, describes a diffractive array generator that may be used in system 300. The surface of the diffractive array generator has a thin surface-relief topology that is periodic in two orthogonal directions. The amount of power in each of multiple intensity profiles 534, 536, 538, 540 is determined by the depth and complexity of the structure of the surface-relief topology, the material of the diffractive array generator, and the intensity of the light generated by light source 104. The spacing between adjacent intensity profiles is determined by the period of the surface-relief topology in each direction, the center wavelength of the light generated by light source 104, and the characteristics of any imaging optics (not shown) positioned between DOE 302 and surface 106.

In addition to the improved intensity profile, DOE 302 can be designed to require less precise alignment with respect to the optical source 304 or can be fabricated into the same package as the optical element. This advantage can reduce the cost and complexity of the system over one that requires a lens 102 as shown in FIG. 1.

Figure 6:
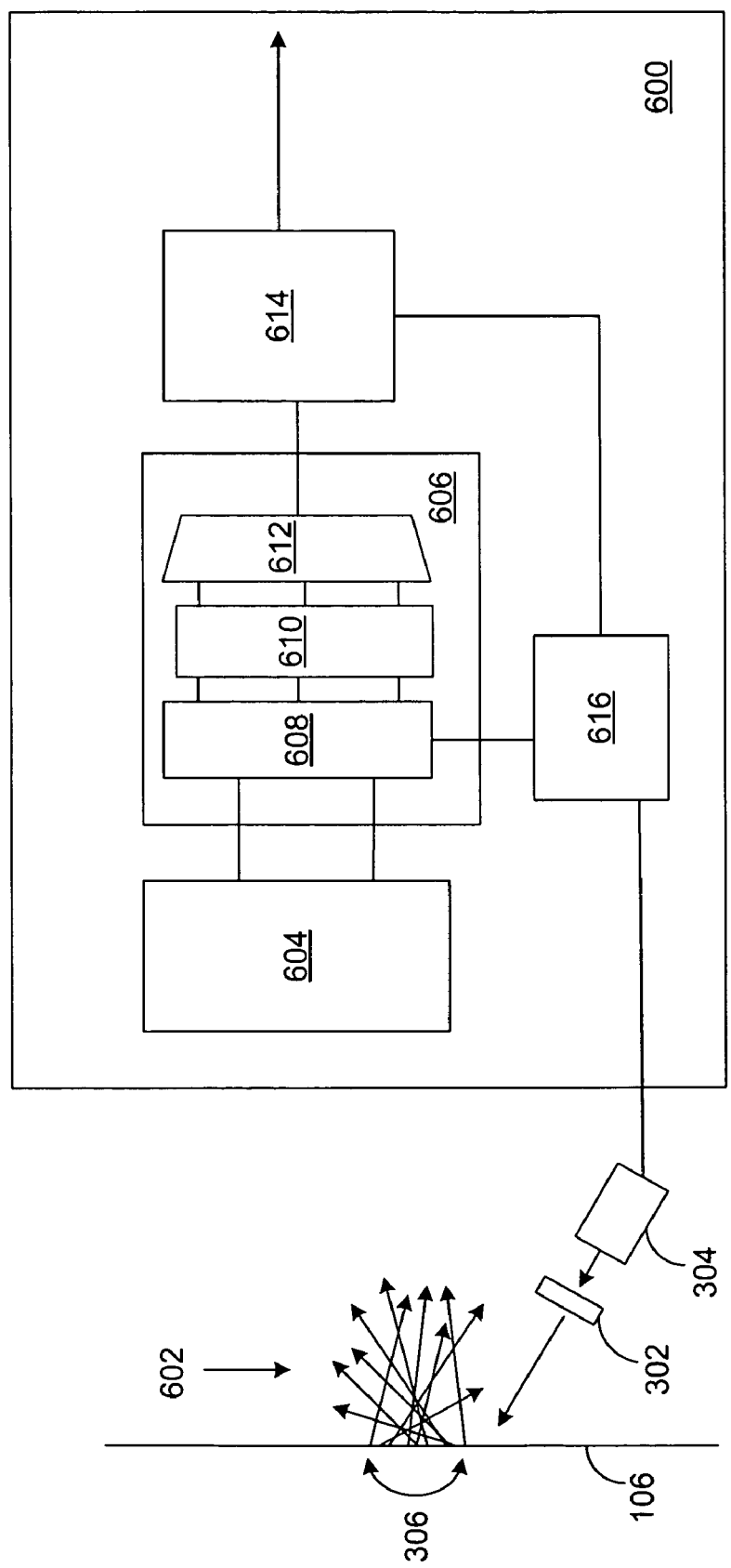
FIG. 6 is a block diagram of a portion of an optical navigation device implemented with the optical illumination system of FIG. 3.

Referring to FIG. 6, there is shown a block diagram of a portion of an optical navigation device in an embodiment in accordance with the invention. Only the elements needed to describe the invention are illustrated in FIG. 6. An optical navigation device may be implemented, for example, as an optical computer mouse.

Light source 304 emits light towards surface 106, such as a desktop or other suitable navigation surface. DOE 302 creates a substantially uniform intensity profile at illumination area 306. As optical navigation device 600 moves over surface 106, the reflected light 602 creates substantially uniform speckle patterns that are captured by detector 604. Detector 604 may be implemented with any number of spatial filters in one embodiment in accordance with the invention.

The output from detector 604 is input into capture and process unit 606. In an embodiment in accordance with the invention, capture and process unit 606 includes electronic shutter and signal integration unit 608 and analog-to-digital converter 610. Charge is integrated when electronic shutter 608 is open. When electronic shutter 608 is closed, charge does not accumulate or the value is reset to zero.

Analog-to-digital converter 610 receives analog signals from integration unit 608 and converts the signals to digital signals. Multiplexer 612 then transmits the signals to motion measurement unit 614. Motion measurement unit 614 determines the motion or velocity of optical navigation device 600. Signals output from motion measurement unit 614 are then typically transmitted to a computing device (not shown).

The signals output from motion measurement unit 614 are also transmitted to controller 616. Based on the signals output from motion measurement unit 614, controller 616 transmits a signal to electronic shutter 608 that controls or adjusts the amount of time shutter 608 is open. Controller 616 also provides power to light source 304 to turn light source on and off and vary the intensity of light source 304.

The invention claimed is:

1. A system for illuminating a surface to generate one or more speckle patterns having substantially uniform intensities and sizes, wherein each speckle pattern is comprised of light reflected off the surface, the system comprising:
   a spatially coherent light source operable to emit light towards the surface; and
   a diffractive optical element disposed in an optical path between the coherent light source and the surface and configured to disperse the light and control the size and intensity of each generated speckle pattern.

2. The system of claim 1, wherein the diffractive optical element comprises a diffractive array generator.

3. The system of claim 1, further comprising a detector for sensing light reflected off the surface.

4. The system of claim 3, further comprising an optical element disposed in an optical path between the surface and the detector.

5. The system of claim 4, wherein the optical element comprises an aperture.

6. The system of claim 4, wherein the optical element comprises a lens.

7. The system of claim 1, wherein the diffractive optical element is implemented separately from the spatially coherent light source.

8. The system of claim 1, wherein the diffractive optical element is integrated with the spatially coherent light source.

9. A system for illuminating a surface to generate one or more speckle patterns having substantially uniform intensities and sizes, wherein each speckle pattern is comprised of light reflected off the surface, the system comprising:
   a spatially coherent light source;
   a diffractive optical element disposed in an optical path between the coherent light source and the surface and configured to disperse the light emitted by the spatially coherent light source and control the sizes and intensity of each of the one or more generated speckle patterns; and
   a detector disposed to receive light reflected off the surface.

10. The system of claim 9, wherein the diffractive optical element comprises a diffractive array generator.

11. The system of claim 9, further comprising an optical element disposed in an optical path between the surface and the detector.

12. A method for generating one or more speckle patterns having substantially uniform intensities and sizes, wherein each speckle pattern is comprised of light reflected off a surface, the method comprising:
 transmitting light from a coherent source towards the surface; and
 before the light strikes the surface, dispersing the light in an illumination area on the surface such that each generated speckle pattern has a substantially uniform size and intensity.

13. The method of claim 12, further comprising detecting light reflected off the surface.

14. The method of claim 13, further comprising transmitting the light through an optical element prior to detecting light reflected off the surface.

15. The method of claim 12, wherein dispersing the light in an illumination area on the surface comprises transmitting the light through a diffractive optical element to dispersing the light in an illumination area on the surface.

16. The method of claim 15, wherein the diffractive optical element disperses the light into a plurality of beamlets in the illumination area such that an intensity profile of each beamlet produces an overall intensity profile having a substantially uniform intensity profile when the intensity profiles for the plurality of beamlets are combined.

* * * * *